United States Patent
Zhou

(10) Patent No.: US 7,600,074 B2
(45) Date of Patent: Oct. 6, 2009

(54) CONTROLLER OF REDUNDANT ARRAYS OF INDEPENDENT DISKS AND OPERATION METHOD THEREOF

(75) Inventor: William Zhou, Taipei (TW)

(73) Assignee: Via Technologies, Inc., Taipei (TW)

( * ) Notice: Subject to any disclaimer, the term of this patent is extended or adjusted under 35 U.S.C. 154(b) by 398 days.

(21) Appl. No.: 11/543,807

(22) Filed: Oct. 6, 2006

(65) Prior Publication Data

US 2007/0083708 A1 Apr. 12, 2007

(30) Foreign Application Priority Data

Oct. 7, 2005 (TW) ............................. 94135158 A

(51) Int. Cl.
*G06F 12/12* (2006.01)
(52) U.S. Cl. ....................... 711/114; 711/112
(58) Field of Classification Search ........................ None
See application file for complete search history.

(56) References Cited

U.S. PATENT DOCUMENTS

| | | | |
|---|---|---|---|
| 5,249,279 A | 9/1993 | Schmenk et al. | |
| 6,738,831 B2 * | 5/2004 | Wolrich et al. | 710/5 |
| 6,820,172 B2 * | 11/2004 | Nielsen et al. | 711/114 |
| 7,137,038 B2 * | 11/2006 | New et al. | 714/42 |
| 2005/0216633 A1 * | 9/2005 | Cavallo | 710/260 |

* cited by examiner

*Primary Examiner*—Hyung S Sough
*Assistant Examiner*—Ngoc V Dinh
(74) *Attorney, Agent, or Firm*—Rosenberg, Klein & Lee

(57) ABSTRACT

A controller and operation method for RAID (Redundant Array of Independent Disks) is provided. The controller includes a receiving module, a splitting module, a sorting module and a transceiver. And the operation method includes the following steps. First, at least one read/write command is received from a command source. Next, the read/write command is translated into a plurality of instructions. Sequentially, the instructions are sorted after the execution sequence of the instructions is analyzed. And then, the instructions are transmitted to a plurality of data storages correspondingly. Finally, an IRQ (Interrupt Request) signal is received from each of the data storages.

21 Claims, 4 Drawing Sheets

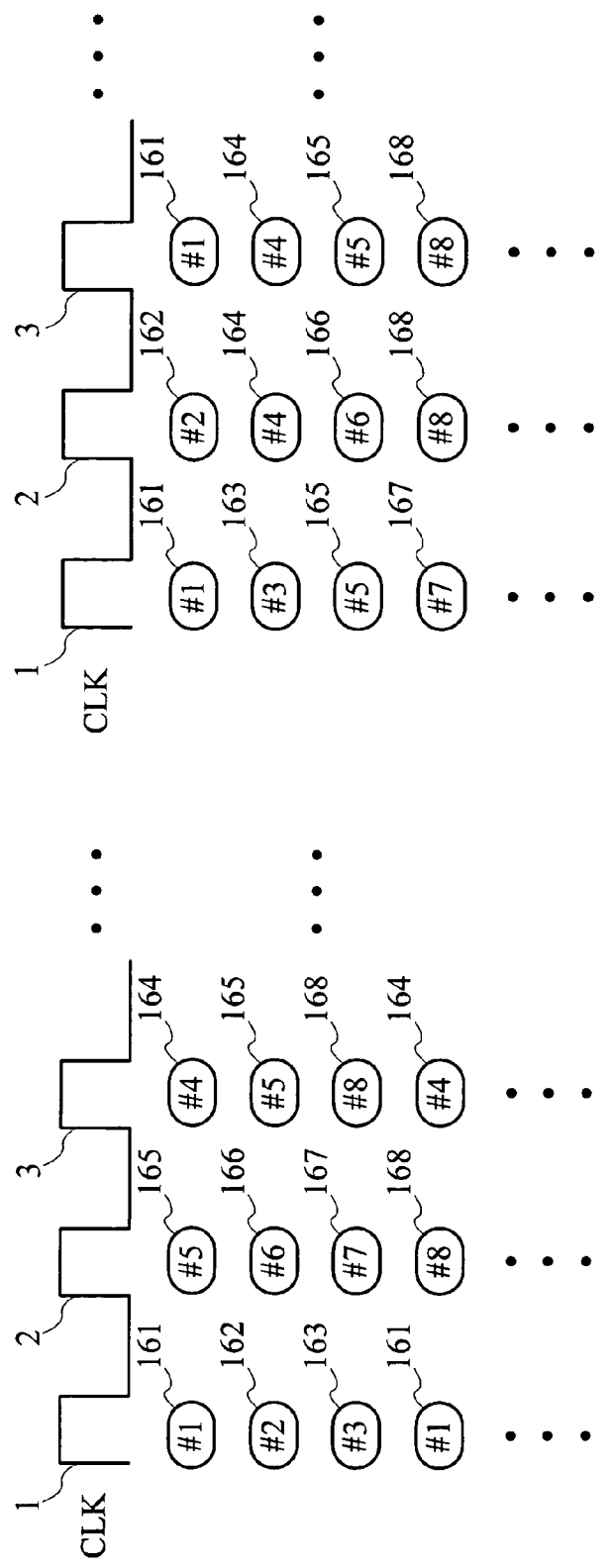

CONTROLLER OF REDUNDANT ARRAYS OF INDEPENDENT DISKS AND OPERATION METHOD THEREOF

FIELD OF THE INVENTION

The present invention relates to a controller and method for RAID (Redundant Array of Independent Disks), and more particularly to the RAID controller and the operation method for translating read/write commands into a plurality of instructions.

BACKGROUND OF THE INVENTION

In a computer system, a HDD (hard disk drive) is one of the most popular data storage devices. However, accessing data from a HDD is limited by mechanical technology, even a high frequency CPU (Central Process Unit) and RAM (Random Access Memory) having higher accessing rate are provide in the computer system. In fact, HDD access speed is a bottleneck of a computer system, and hence RAID (Redundant Array of Independent Disks) is created in order to enhance data storage performance and data storage capacity. Accordingly, RAID systems are the best choices of middle/low end data storage equipments due to great requirements of data storage equipments with high speed and large capacity as network springs up and plenty of servers are utilized.

The operation of a conventional RAID controller simply depends on RAID levels and the numbers of HDDs. The conventional RAID controller can spread out blocks of each file across multiple HDDs via a bus. Each specific file is restored by simultaneously collecting all corresponding blocks from multiple HDDs while accessing data. In other words, the conventional RAID controller activates the read/write heads of multiple HDDs at the same time in order to rapidly access data.

However, in practical application, data allocation and hardware implementation usually result in an access time delay. For example, the access time delay is resulted from that a plurality of disks are coupled to a bus, or the conventional RAID controller simultaneously reads file blocks from different sectors within a HDD. So theoretically, although the conventional RAID controller sends an access command to each HDD simultaneously, and in fact, the access to each HDD will still be performed according to a priority. Therefore, the access time delay occurred insidiously will decrease the RAID performance.

SUMMARY OF THE INVENTION

Therefore, the present invention provides a controller and operation method for RAID.

In an embodiment, the present invention relates to a controller for RAID (Redundant Array of Independent Disks). The controller includes a receiving module for receiving at least one read/write command from a command source, a splitting module, which is coupled to the receiving module, for translating each of a plurality of read/write commands into a plurality of instructions, a sorting module, which is coupled to the splitting module, for sorting the instructions after the execution sequence of the instructions is analyzed, and a transceiver, which is coupled to the splitting module and a plurality of data storages, for transmitting the sorted instructions to the corresponding data storages and receiving the IRQ (Interrupt Request) signal from each of the data storages.

In another embodiment, the present invention also relates to an operation method for RAID. The operation method includes the following steps. First, at least one read/write command is received from a command source. Next, the read/write command is translated into a plurality of instructions. Sequentially, the instructions are sorted after the execution sequence of the instructions is analyzed. And then, the instructions are transmitted to a plurality of data storages correspondingly. Finally, an IRO (Interrupt Request) signal is received from each of the data storages.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 4A is a diagram for each instruction before sorting according to the embodiment of the present invention; and FIG. 4B is a diagram for each instruction after sorting according to the embodiment of the present invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
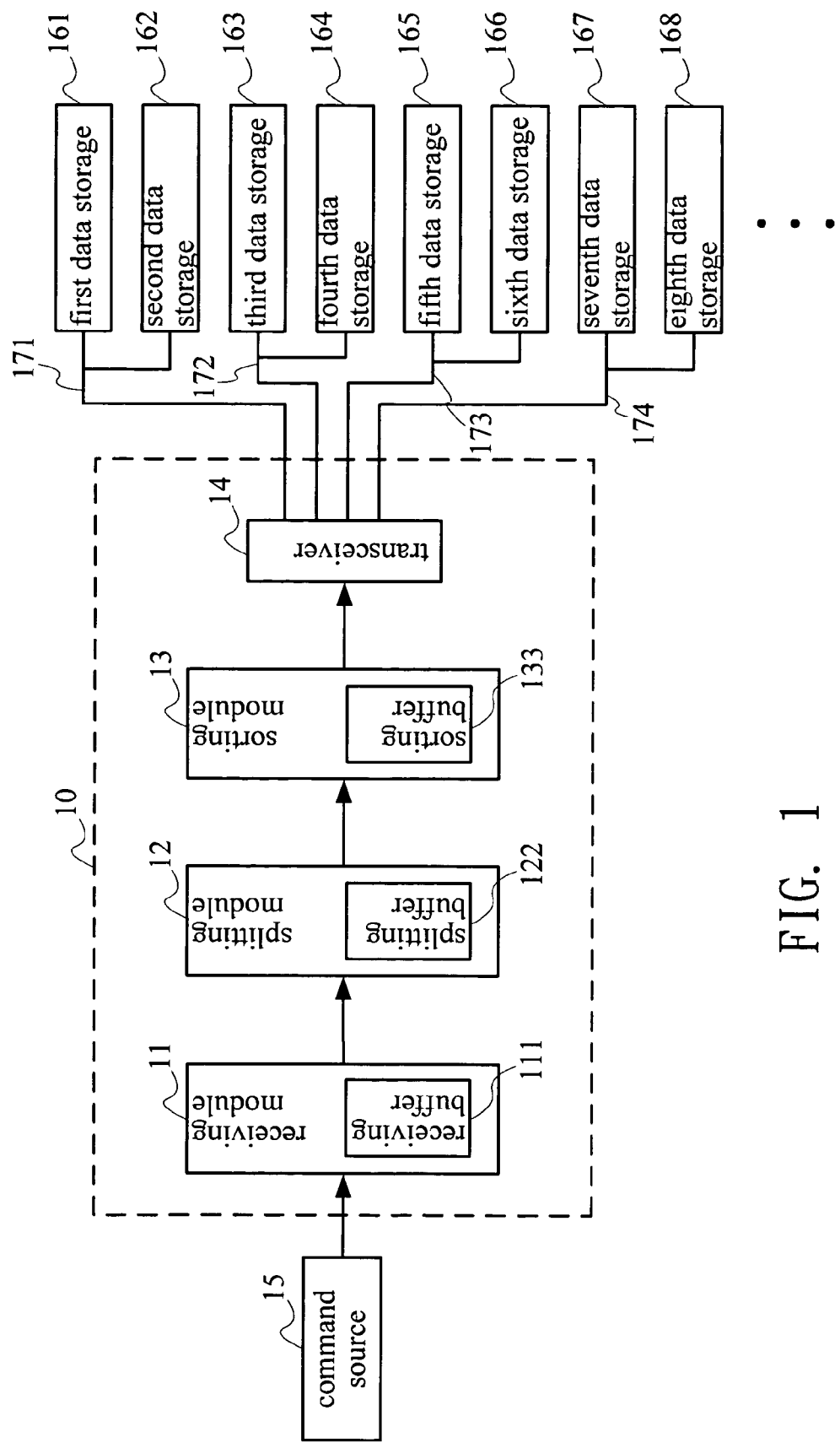
FIG. 1 is a RAID system according to an embodiment of the present invention.

Referring to FIG. 1, a block diagram of a RAID system according to an embodiment of the present invention is shown. As shown in FIG. 1, a controller 10 includes a receiving module 11, a splitting module 12, a sorting module 13, and a transceiver 14.

The receiving module 11 is used to receive at least one read/write command from a command source 15. After transmitting each read/write command to the splitting module 12 coupled to the receiving module 11, the splitting module 12 will translate each read/write command into a plurality of instructions. Thereafter, the sorting module 13 analyzes the execution sequence of the instructions, and best optimizes the execution sequence. And then, the transceiver 14 simultaneously transmits the sorted instructions to the corresponding data storage, like a first data storage 161, a second data storage 162, a third data storage 163, and so on, through a plurality of buses 171 to 174 in parallel. The transceiver 14, which is coupled to said splitting module 12 and a plurality of data storages, is used to transmit the sorted instructions to the corresponding data storages, to receive the IRQ (Interrupt Request) signal from each of the data storages 161 to 168, and to understand whether the data storages 161 to 168 have finished the operation or not. After the data storages have finished a batch of operations, the controller 10 will transmit other instructions to the data storages 161 to 168 again.

When the splitting module 12 translates a read/write command into a plurality of instructions, each of the instructions at least includes an identity code, an address, and a data length, wherein the identity code stands for the corresponding data storage, the address points out in which sector data records within the data storage. Accordingly, the transceiver 14 can transmit each of the instructions to the corresponding data storage correctly, and finish the read or write command surely according to the address and the data length.

The receiving module 11 further comprises a receiving buffer 111 used to store the received read/write command. The splitting module 12 comprises a splitting buffer 122 used to store the instructions. The sorting module 13 comprises a sorting buffer 133 used to store the sorted instructions. By depositing each of the provided buffers 111, 122, and 133, each of modules 11, 12, and 13 can temporarily work individually, and store working results to the corresponding buffers 111, 122, and 133 for the sake of multitasking. Therefore, the waiting time period among the modules 11, 12 and 13 can be efficiently shorted.

Figure 2:
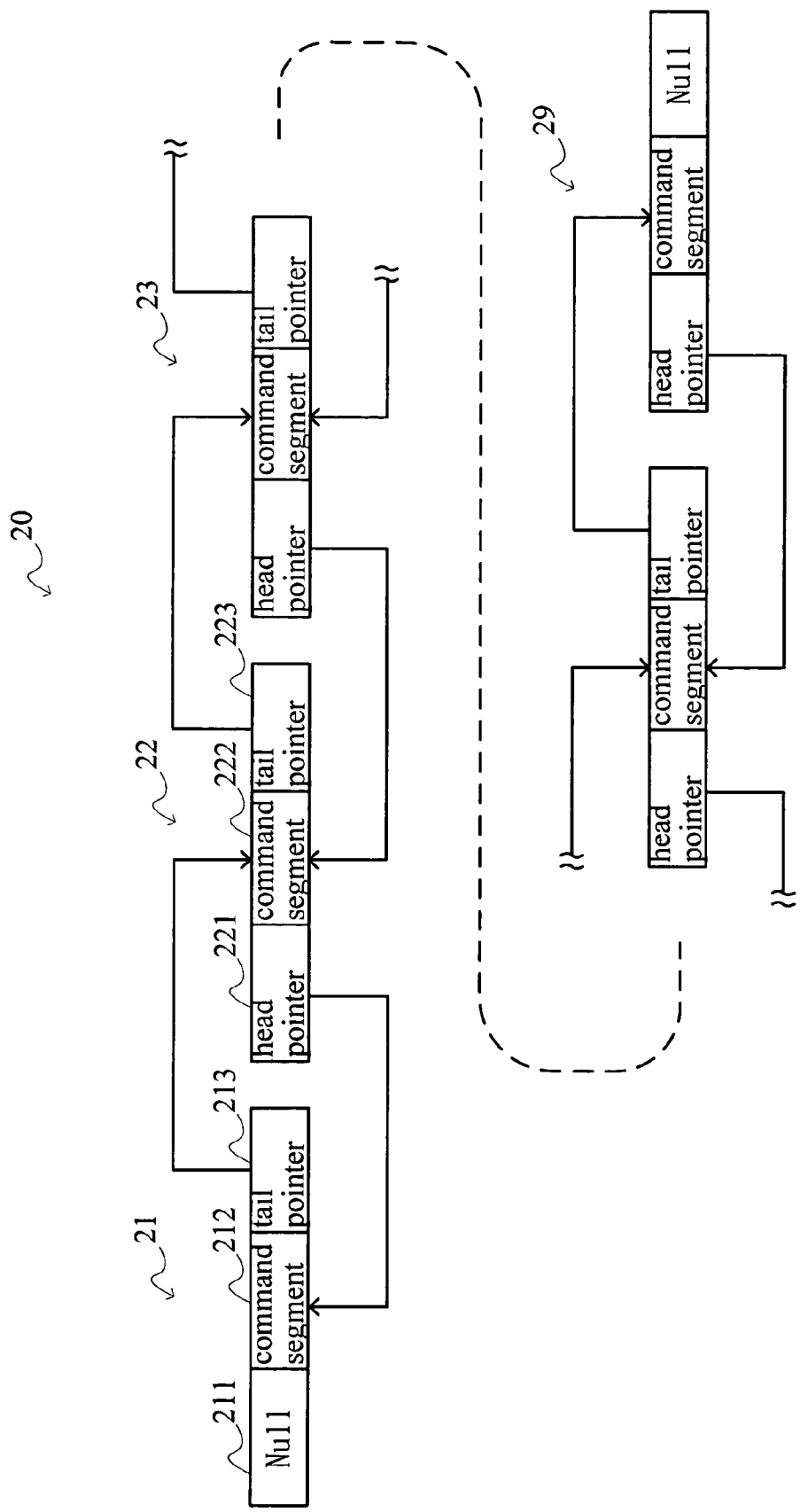
FIG. 2 is a related diagram for illustrating a double linked list.

Referring to FIG. 2, a related diagram for illustrating a double linked list is shown. According to the embodiment of the present invention, the splitting module 12 and the sorting module 13 respectively store instructions in a way of the double linked list. The double linked list 20 includes a plurality of data nodes, relating to each other in a sequence, and each of the data nodes includes a head pointer, a command segment, and a tail pointer. For example, the first data node 21 includes a first head pointer 211, a first command segment 212, and a first tail pointer 213; the second data node 22 includes a second head pointer 221, a second command segment 222, a second tail pointer 223, and so on.

An instruction can be stored into the command segment of a data node. For example, a first instruction is stored into the first command segment 212, and a second instruction is stored into the second command segment 222, and so on. The first head pointer 211 points to null because of the start of the first data node 21, the first tail pointer 213 points to the second data node 22. The second head pointer 221 points to the first data node 21, and the second tail pointer 223 points to the third data node 23. And then, relationships to the rest data nodes are able to reason by analogy. Therefore, the double linked list can be used to link each of data nodes according to the head pointer and the tail pointer, which respectively point to the corresponding data nodes. Thus, relationships to data nodes can be clearly pointed out such that the original content of the read/write command can be completely reserved.

In accordance with the relationship to each of data nodes, the sorting module 13 can analyze an execution sequence of the instructions. If the execution of a certain instruction will be advanced or postponed, the address, which is of the specific data node, recorded in the double linked list 20 must be changed accordingly. That is, the sorting module 13 only needs to adjust the head pointer of the next data node and the tail pointer of the former data node when the specific data node is deleted from the double linked list 20. Therefore, a new link is built between two successive data nodes. For example, the splitting module 12 or the sorting module 13 will change the first tail pointer 213 to point to the third data node 23, and the third head pointer to point to the first data node 21 if the second data node 22 is deleted from the double linked list 20. Equally, once a new data node is recorded in the double linked list 20, the sorting module 13 will also adjust the head pointers and the tail pointers of the relative data nodes to built new links among the relative data nodes.

Thus, while the sorting module 13 is going to delete or add a certain data node, only the relative head pointers and tail pointers have to be adjusted. The sorting module 13 can easily and rapidly finish the operation without moving plenty of data.

Figure 3:
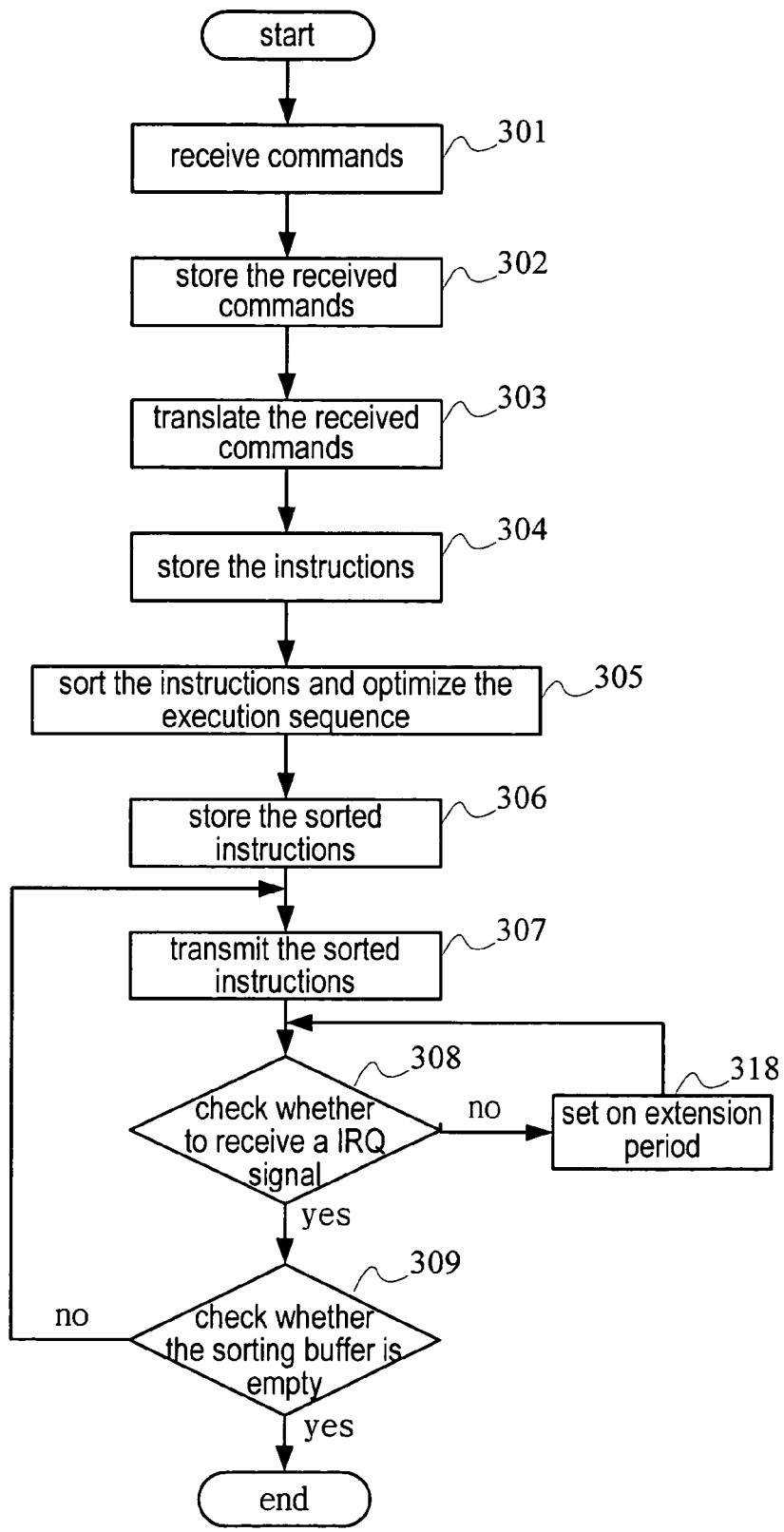
FIG. 3 is a flowchart of an operation method for RAID according to a preferred embodiment of the present invention.

Referring to FIG. 3, a flowchart of an operation method for RAID according to a preferred embodiment of the present invention is provided. In step 301, the receiving module 11 receives at least one read/write command from a command source. Next, in step 303, the splitting module 13 translates the received commands into a plurality of instructions in turn. Sequentially, in step 305, the sorting module 13 analyzes the execution sequence of the instructions, and best optimizes the execution sequence. Sequentially, in step 307, the transceiver 14 simultaneously transmits the sorted batch instructions to the corresponding data storages in parallel. Thus, the RAID performance can be efficiently enhanced according to the above-mentioned steps.

Besides, in step 302 following after step 301, the receiving module 11 stores the received read/write commands into the receiving buffer 111. Afterward, in step 304 following after step 303, the splitting module 12 stores the instructions into the splitting buffer 122. And then, in step 306 following after step 305, the sorting module 13 stores the optimal-sorted instructions into the sorting buffer 133.

As the embodiments of the present invention, the operation results of the receiving module 11, the sorting module 12, and the sorting module 13 can be respectively stored into the corresponding buffers. And thus, the operation performance can be enhanced.

Moreover, in step 308 following after step 307, the transceiver 14 checks whether the feedback IRQ signals issued from data storages are received. If no, in step 318, each of data storages has not finished the execution of batch instructions yet, and it will keep on executing the instructions during an extension period set by users. And then, by repeating step 308, if the feedback IRQ signals issued from data storages are received, the execution of batch instructions is finished and the following step 309 will proceed.

Because the corresponding data node stored in the sorting buffer 133 is deleted from the double linked list 20 after the corresponding instruction is transmitted, it is to be checked that whether the sorting buffer 133 is empty in step 309. If no, there are still unsent instructions in the sorting buffer 133. And then, repeating step 307 and the following steps form the looping. If yes in step 309, all the instructions have been executed and the procedure comes to the end.

Referring to FIG. 4A and FIG. 4B, respective diagrams for each instruction before and after sorting are provided according to the present invention. Furthermore, turning back to FIG. 1, the first data storage 161 and the second data storage 162 are coupled to the first bus 171 in common, the third data storage 163 and the fourth data storage 164 are coupled to the second bus 172 in common, the fifth data storage 165 and the sixth data storage 166 are coupled to the third bus 173 in common; the seventh data storage 167 and the eighth data storage 168 are coupled to the fourth bus 174 in common, and so on.

Accordingly, a common bus only can be occupied by a certain data storage in the meantime, and meanwhile the certain data storage only can execute an instruction. The following description will simply explain the system operation procedure. It is assumed that each of data storages just executes a single instruction during a specific period of time. At this time, once a read/write command on the basis of RAID levels has been translated into a plurality of instructions, the operation sequence of the data storages is shown as FIG. 4A.

As shown in FIG. 4A, in theory, the first data storage 161 should execute two instructions during the first period of time, and the second data storage 162 and the third data storage 163 respectively executes one instruction. During the second period of time, the fifth data storage 165, the sixth data storage 166, the seventh data storage 167, and the eighth data storage 168 are respectively asked for executing a single instruction. During the third period of time, the fourth data storage 164 should execute two different instructions, and the fifth data storage 165 and the eighth data storage 168 are respectively asked for executing only one instruction.

However, with the limitation of the system architecture, it is difficult to simultaneously transmit the batch instructions to the corresponding data storages during each period of time. In practical application, different instructions, which are going to be executed in the same period of time, will be carried out in more that two periods. And then, the following batch instructions will be executed after the execution of the former batch instructions is well done. That will result in decrease of the RAID performance.

Thus, in order to solve the above-mentioned problems and enhance the RAID performance, the execution sequence of instructions has to be best optimized. The further detail description is presented thereinafter.

The sorting module 13 according to the embodiment of the present invention is implemented on the basis of the system architecture or RAID levels, and instructions, which can be executed at the same time, are sorted in principle of priority. Therefore, according to the present invention, the operation sequence of the data storages can be shown as FIG. 4B by way of analyzing the execution sequence of the instructions and best optimizing the execution sequence. As shown in FIG. 4B, during the first period of time, only the first data storage 161, the third data storage 163, the fifth data storage 165, and seventh data storage 167 are respectively supposed to execute instructions; during the second period of time, only the second data storage 162, the fourth data storage 164, the sixth data storage 166, and eighth data storage 168 are respectively supposed to execute instructions; during the third period of time, the first data storage 161, the fourth data storage 164, the fifth data storage 165, and eighth data storage 168 are respectively supposed to execute instructions; and so on. Thus, each of data storages doesn't execute a plurality of instructions during the same period of time and meanwhile some data storages don't ask for the use of a common bus. In other words, batch instructions will be executed more efficiently and the RAID performance is enhanced.

Besides, the operation system (OS) or application program can implement the command source in the present invention. And, the RAID controller and operation method thereof according to the present invention can be implemented by hardware, software, and a firmware.

As the mentioned above, the present invention is related to a controller and method for RAID, and the controller can translate the read/write commands from RAID into a plurality of instructions and optimize the execution sequence; thus, the read/write speed can be efficiently improved.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A controller for RAID (Redundant Array of Independent Disks), comprising:
    a receiving module for receiving at least one read/write command from a command source;
    a splitting module, coupled to said receiving module, for translating each of a plurality of read/write commands into a plurality of instructions having an execution sequence;
    a sorting module, coupled to said splitting module, for sorting said instructions to selectively modify the execution sequence of said instructions; and
    a transceiver, coupled to said splitting module and a plurality of data storages, for transmitting the sorted instructions to said corresponding data storages, and receiving the IRQ (Interrupt Request) signal from each of said data storages.

2. The controller of claim 1, wherein said receiving module further comprises a receiving buffer for storing said read/write commands.

3. The controller of claim 1, wherein said splitting module further comprises a splitting buffer for storing said instructions.

4. The controller of claim 1, wherein said sorting module further comprises a sorting buffer for storing said sorted instructions.

5. The controller of claim 1, wherein each of said instructions comprises an identity code and said identity code stands for the corresponding data storage.

6. The controller of claim 5, wherein said instructions can be stored in a way of double linked list.

7. The controller of claim 6, wherein said double linked list comprises a plurality of data nodes, relating to each other in a sequence, each of said data nodes comprising a head pointer, a command segment, and a tail pointer.

8. The controller of claim 7, wherein each said command segment is used to store the corresponding said instruction.

9. The controller of claim 7, wherein each said head pointer is used to point to a former data node, and each said tail pointer is used to point to a next data node.

10. The controller of claim 1, wherein said controller can be implemented by one of a hardware, a software, and a firmware.

11. The controller of claim 1, wherein said command source can be selected from one of an operation system and an application program.

12. The controller of claim 1, wherein said sorting module is operable to sort said instructions for execution within a series of operational time periods for said data storages, said instructions within a common operational time period being concurrently executable one relative to the other.

13. The controller of claim 1, wherein said splitting module is operable to translate said read/write commands into said instructions to each be executed by a corresponding one of said data storages during a selectively specified operational time period.

14. An operation method for RAID (Redundant Array of Independent Disks), comprising the steps of:
    receiving at least one read/write command from a command source;
    translating said read/write command into a plurality of instructions having an execution sequence;
    sorting said instructions to selectively modify the execution sequence of said instructions;
    transmitting said instructions to a plurality of data storages correspondingly; and
    receiving an IRQ (Interrupt Request) signal from each of said data storages.

15. The operation method of claim 14, further comprising:
    storing said read/write command into a receiving buffer after receiving said read/write command;
    storing said instructions into a splitting buffer after translating said read/write command; and
    storing said instructions into a sorting buffer after sorting said instructions.

16. The operation method of claim 15, further comprising:
    checking whether there are any unsent instructions in said sorting buffer;

transmitting said unsent instructions from said sorting buffer if there are said unsent instructions; and stopping a preceding procedure if there is no unsent instruction in said sorting buffer.

17. An operation method for RAID (Redundant Array of Independent Disks), comprising the steps of:

receiving at least one read/write command from a command source;

translating said read/write command into a plurality of instructions;

sorting said instructions after an execution sequence of said instructions is analyzed;

transmitting said instructions to a plurality of data storages correspondingly;

receiving an IRQ (Interrupt Request) signal from each of said data storages;

storing said read/write command into a receiving buffer after receiving said read/write command;

storing said instructions into a splitting buffer after translating said read/write command;

storing said instructions into a sorting buffer after sorting said instructions;

checking whether each of said data storages has transmitted said IRQ signal;

checking repeatedly whether there are any unsent instructions in said sorting buffer if each of said data storages does transmit said IRQ signal;

stopping a preceding procedure if there is no unsent instruction in said sorting buffer; and setting an extension period to recognize again whether each of said data storages has transmitted said IRQ signal.

18. The operation method of claim 14, wherein each of said instructions comprises an identity code and said identity code stands for the corresponding data storage.

19. The operation method of claim 14, wherein said instructions can be stored in a way of double linked list.

20. The operation method of claim 19, wherein said double linked list comprises a plurality of data nodes, relating to each other in a sequence, each of said data nodes comprising a head pointer, a command segment, and a tail pointer.

21. The operation method of claim 20, wherein each said head pointer is used to point to the former data node, and each said tail pointer is used to point to the next data node.

* * * * *